United States Patent
Nagy

(10) Patent No.: US 10,005,330 B2
(45) Date of Patent: Jun. 26, 2018

(54) TRAILER HITCH

(71) Applicant: James Nagy, Cheboygan, MI (US)

(72) Inventor: James Nagy, Cheboygan, MI (US)

(*) Notice: Subject to any disclaimer, the term of this patent is extended or adjusted under 35 U.S.C. 154(b) by 0 days. days.

(21) Appl. No.: 15/353,725

(22) Filed: Nov. 16, 2016

(65) Prior Publication Data
US 2018/0134104 A1    May 17, 2018

(51) Int. Cl.
*B60D 1/07*     (2006.01)
*B60D 1/06*     (2006.01)
*B60D 1/52*     (2006.01)
*B60D 1/145*    (2006.01)

(52) U.S. Cl.
CPC .............. *B60D 1/07* (2013.01); *B60D 1/065* (2013.01); *B60D 1/145* (2013.01); *B60D 1/52* (2013.01)

(58) Field of Classification Search
CPC ....................................................... B60D 1/07
See application file for complete search history.

(56) References Cited

U.S. PATENT DOCUMENTS

| | | | | |
|---|---|---|---|---|
| 2,142,365 A * | 1/1939 | McKee | ................. | B60D 1/065 224/520 |
| 5,727,805 A * | 3/1998 | La Roque | ............. | B60D 1/155 280/478.1 |
| 6,789,815 B2 * | 9/2004 | Moss | ...................... | B60D 1/06 280/416.1 |
| 6,969,085 B2 * | 11/2005 | Causey, Jr. | ........... | B60D 1/065 280/432 |
| 8,033,563 B2 * | 10/2011 | Good | .................... | B60D 1/065 280/416.1 |
| 8,276,931 B2 * | 10/2012 | DeKarske | ............... | B60D 1/06 280/507 |
| 8,371,603 B2 * | 2/2013 | Columbia | ............... | B60D 1/06 280/504 |
| 9,457,631 B1 * | 10/2016 | Kennemer | .............. | B60D 1/07 |

* cited by examiner

*Primary Examiner* — Kevin Hurley
(74) *Attorney, Agent, or Firm* — Mitchell Law PLLC; Matthew W. Mitchell

(57) ABSTRACT

A trailer hitch apparatus is disclosed. The apparatus includes a tubular receiving member, a base, an arm extending from the base, a first tow ball extending from a first side of the arm, and a second tow ball extending from an opposite second side of the arm. The tubular receiving member is configured to be removably attached to a vehicle. A retainer assembly is configured to be selectively engage the first tow ball.

19 Claims, 3 Drawing Sheets

TRAILER HITCH

TECHNICAL FIELD

This disclosure relates to towing, and more particularly to a towing apparatus.

BACKGROUND

The statements in this section merely provide background information related to the present disclosure and may not constitute prior art.

Tow hitch assemblies are commonly used for the towing of trailers, and wheeled vehicles, e.g., automobile, cement mixer, recreational vehicle by another vehicle, e.g., automobile, truck, or van. Tow hitches are known to include a tow ball secured on the rear of a towing vehicle and a coupler or socket for the tow ball attached to a trailer or towed vehicle. Although it is desirable to tow different types of trailers and vehicles behind the same vehicle, different trailers and vehicles may have couplers which differ in structure and configuration and which do not fit or mate with the tow ball attached to the towing vehicle. In order to tow a trailer or a vehicle with a non-matching coupler, the tow ball must be removed and replaced with a different sized tow ball.

Further, anti-theft and safety devices for ball and socket type trailer hitches are conventionally utilized to prevent unintentional and unauthorized disengagement of a socket and tow ball. Such devices can be difficult to use with tow balls of differing sizes and generally require a tow ball sized and adapted for a particular coupler. In some situations, a user may change trailers or towed vehicles frequently.

Accordingly, it would be an advance in the art to provide a hitch with multiple sized tow balls enabling a user to quickly change tow ball sizes for coupling to a coupler of another vehicle or trailer.

SUMMARY

A trailer hitch apparatus is disclosed. The apparatus includes a tubular receiving member, a base, an arm extending from the base, a first tow ball extending from a first side of the arm, and a second tow ball extending from an opposite second side of the arm. The tubular receiving member is configured to be removably attached to a vehicle. A retainer assembly is configured to be selectively engage the first tow ball.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
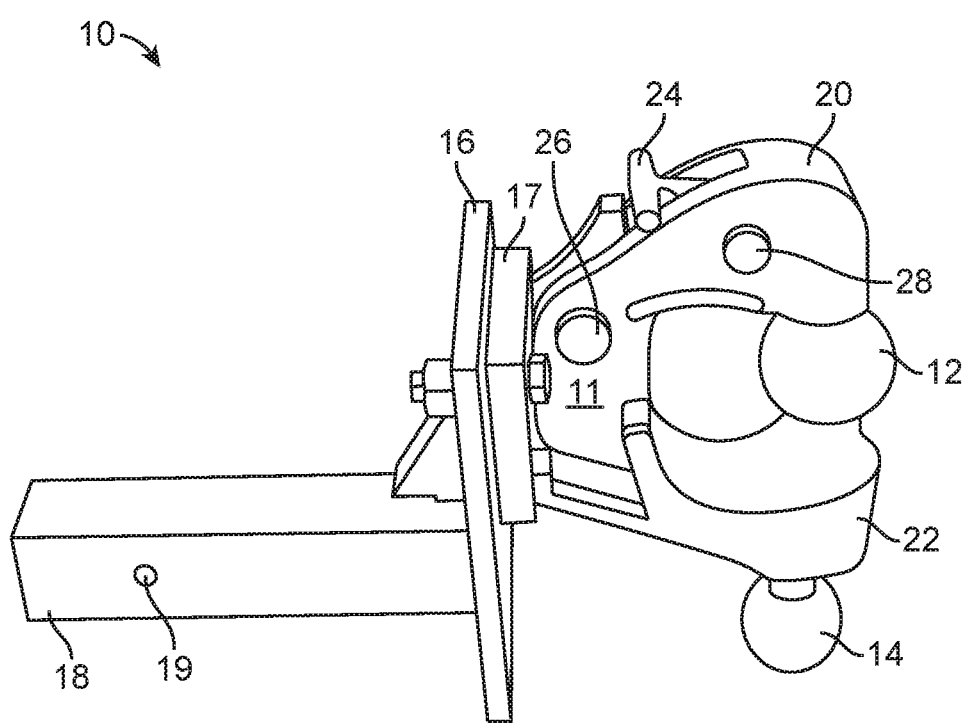
FIG. 1 is a slight perspective view of a hitch, in accordance with the present disclosure.
Figure 2:
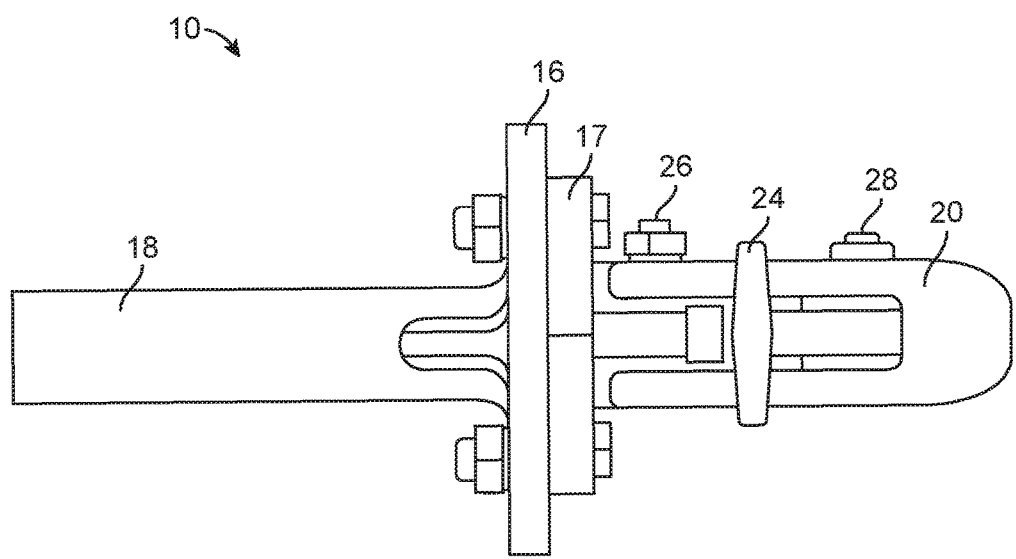
FIG. 2 is a top view of a hitch, in accordance with the present disclosure.
Figure 3:
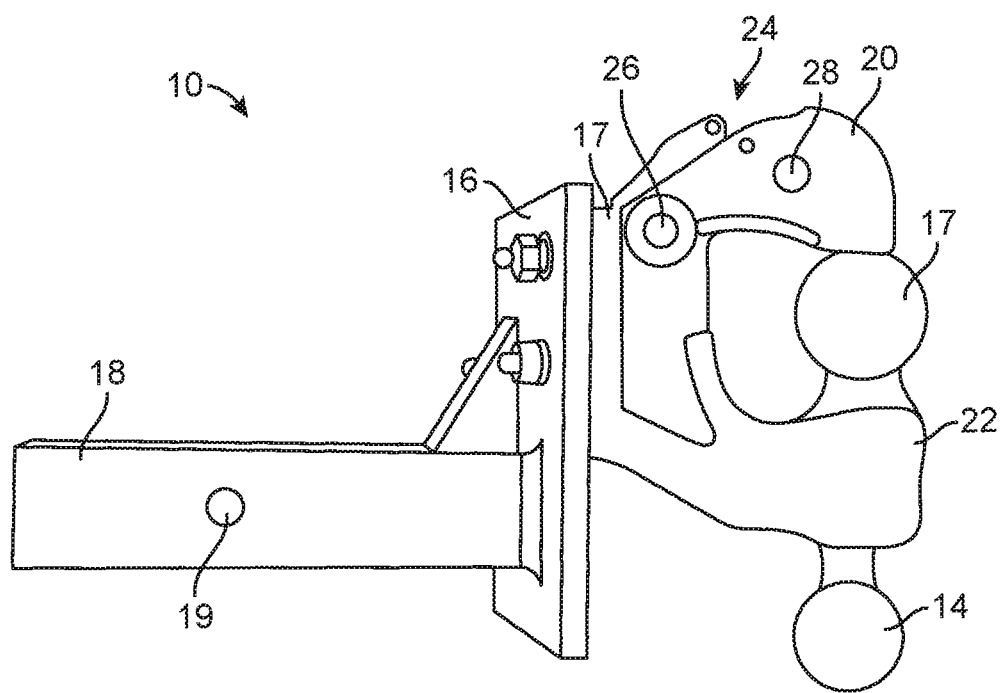
FIG. 3 is a side view of a hitch, in accordance with the present disclosure.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to FIG. 1, a hitch 10, according to some embodiments of the present invention, is illustrated. The hitch 10 is configured to be mounted to a vehicle, and typically to a hitch apparatus attached to a vehicle. It is contemplated by the disclosure herein that certain embodiments of the hitch can be removably attached to any type of hitch apparatus without limitation. Moreover, embodiments of the hitch 10 can be removably attached to a vehicle in various other ways without limitation. In one embodiment, the hitch 10 includes a tubular receiving member 18 adapted to fit within a receiver secured to the undercarriage of a vehicle. An aperture 19 may be formed in the tubular receiving member 18 to provide a method for pinning and securing the tubular receiving member 18 within the receiver.

The hitch 10 includes a base 11 and an arm 22 that extends from the base 11. A first tow ball 12 extends from a first side of the arm 22 and a second tow ball 14 that extends from a second side of the arm 22. The first and second tow balls 12 and 14 have, in one embodiment, different sizes to accommodate trailer couplers of different sizes, as would be understood by those skilled in the art of the present invention. For example, tow ball 12 may be a two and five sixteenths (2⁵⁄₁₆") ball and tow ball 14 may be a two inch (2") diameter ball. Various combinations of tow ball sizes may be utilized in accordance with embodiments of the present invention.

The hitch 10 may be a single integral piece in some embodiments. In other embodiments, the hitch 10 may be two or more components secured together, for example, via welding and mechanical fasteners. In some embodiments, the tow balls 12 and 14 may be threadingly secured to the coupling apparatus arm 22. The first tow ball 12 is in an upright orientation when the tubular receiving member 18 is attached to a vehicle in the first position, and the second tow ball 14 is in an upright orientation when the tubular receiving member 18 is attached to a vehicle in the second position. The base 11 is integrally or mechanically attached to a face plate 17 for mechanical attachment to a plate 16 of the tubular receiving member 18.

The illustrated hitch 10 also includes a retainer assembly 20 removably attachable to the base 11. The retainer assembly 20 includes a latch that is configured to retain an object (e.g., a coupler associated with a trailer or other towed vehicle) extending around the first tow ball 12. In some embodiments, the retainer assembly 20 is configured to function as a pintle hook.

The retainer assembly 20 is pivotably and removably secured to the base 11 by a mechanical fastener 26 through an opening. The mechanical fastener 26 may be a rod, a pin, a bolt, or any other type of device that can removably secure the retainer assembly 20 to the base 11 and permit rotatable movement. The latch is rotatable between open and locked positions. The retainer assembly 20 includes a lever 24 that is configured to move the latch between open and locked positions. The lever 24 includes opposite first and second end portions as shown in the figures. The illustrated lever 24 also includes a handle with opposite first and second portions, in one embodiment.

The lever 24 is positioned between the latch walls 34 and is rotatably secured to the retainer assembly 20 via a mechanical fastener 28 that extends through an opening. The fastener 28 may be a rod, a pin, a bolt, or any other type of device that can pivotably secure the lever 24 to the latch. The lever 24 is rotatable between open and locked positions, as will be described below. In one embodiment, a biasing element is provided to urge the lever 24 towards the locked position, as would be understood by those skilled in the art of the present invention. The biasing element can be a torsion spring with one end associated with the lever 24 and an opposite end associated with the latch. Various types of biasing elements may be utilized, however, and embodiments of the present invention are not limited to a torsion spring.

Embodiments of the present invention are not limited to the illustrated shape and configuration of the base 11 and arm 22. The base 11 and arm 14 may have various shapes and configurations without limitation. Moreover, the tubular receiving member 18 may be removably secured to a vehicle in various ways.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention.

The invention claimed is:

1. A trailer hitch apparatus comprising:
   a tubular receiving member configured to be removably attached to a vehicle;
   a base;
   an arm extending from the base;
   a first tow ball extending from a first side of the arm;
   a second tow ball extending from an opposite second side of the arm;
   a retainer assembly configured to selectively engage the first tow ball;
   a first plate formed perpendicular to the tubular receiving member; and
   a second plate mechanically connected to the first plate, wherein the base is coupled to the second plate.

2. The trailer hitch apparatus of claim 1, wherein the tubular receiving member further comprises an aperture.

3. The trailer hitch apparatus of claim 1, wherein the first tow ball is larger than the second tow ball, and wherein the first and second tow balls are threadingly secured to the arm for selective removal.

4. The trailer hitch apparatus of claim 1, wherein the retainer assembly is removably attached to the base.

5. The trailer hitch apparatus of claim 1, wherein the retainer assembly comprises a latch configured to retain an object.

6. The trailer hitch apparatus of claim 1, wherein the retainer assembly and the first tow ball are formed to function selectively as a pintle hook.

7. The trailer hitch apparatus of claim 1, wherein the retainer assembly is pivotably secured to the base.

8. The trailer hitch apparatus of claim 1, wherein the retainer assembly is pivotably secured to a perpendicular plate integral to the second plate via a mechanical fastener engaged through an aperture of the perpendicular plate and an aperture of the base.

9. The trailer hitch apparatus of claim 8, wherein the mechanical fastener is one of a rod, a pin, and a bolt.

10. The trailer hitch apparatus of claim 1, wherein the retainer assembly further includes a lever.

11. The trailer hitch apparatus of claim 10, wherein the lever is configured to control a latch.

12. A trailer hitch apparatus comprising:
a tubular receiving member configured to be removably attached to a vehicle, wherein the member comprises an aperture configured to receive a pin;
a first plate formed perpendicular to the tubular receiving member;
a second plate mechanically connected to the first plate, wherein the second plate comprises a perpendicular planar portion having an aperture;
a base coupled to the perpendicular planar portion of the second plate;
an arm extending from the base;
a first tow ball extending from a first side of the arm;
a second tow ball extending from an opposite second side of the arm; and
a retainer assembly configured to selectively engage the first tow ball.

13. The trailer hitch apparatus of claim 12, wherein the first tow ball is larger than the second tow ball, and wherein the first and second tow balls are threadingly secured to the arm for selective removal.

14. The trailer hitch apparatus of claim 12, wherein the retainer assembly is removably and pivotably attached to the base.

15. The trailer hitch apparatus of claim 12, wherein the retainer assembly further includes a lever configured to control a latch configured to retain an object.

16. The trailer hitch apparatus of claim 12, wherein the retainer assembly and the first tow ball are formed to function selectively as a pintle hook.

17. The trailer hitch apparatus of claim 12, wherein the retainer assembly is pivotably secured to a perpendicular plate integral to the second plate via a mechanical fastener engaged through an aperture of the perpendicular plate and an aperture of the base.

18. A trailer hitch apparatus comprising:
a tubular receiving member configured to be removably attached to a vehicle, wherein the member comprises an aperture configured to receive a pin;
a first plate formed perpendicular to the tubular receiving member;
a second plate mechanically connected to the first plate, wherein the second plate comprises a perpendicular planar portion having an aperture;
a base coupled to the perpendicular planar portion of the second plate;
an arm extending from the base;
a first tow ball extending from a first side of the arm;
a second tow ball extending from an opposite second side of the arm, wherein the first tow ball is larger than the second tow ball, and wherein the first and second tow balls are threadingly secured to the arm for selective removal; and
a retainer assembly configured to selectively engage the first tow ball, wherein the retainer assembly is removably and pivotably attached to the base and wherein the retainer assembly and the first tow ball are formed to function selectively as a pintle hook.

19. The trailer hitch apparatus of claim 18, wherein the retainer assembly further includes a lever configured to control a latch configured to retain an object and wherein the retainer assembly is pivotably secured to a perpendicular plate integral to the second plate via a mechanical fastener engaged through an aperture of the perpendicular plate and an aperture of the base.

* * * * *